US012789935B2

(12) United States Patent
Nicolae

(10) Patent No.: US 12,789,935 B2
(45) Date of Patent: Nov. 10, 2026

(54) GUIDANCE SYSTEM AND METHODS FOR VISUALLY IMPAIRED MOTORCYCLE PASSENGERS

(71) Applicant: Microchip Technology Incorporated, Chandler, AZ (US)

(72) Inventor: Marius Nicolae, Bucharest (RO)

(73) Assignee: Microchip Technology Incorporated, Chandler, AZ (US)

( * ) Notice: Subject to any disclaimer, the term of this patent is extended or adjusted under 35 U.S.C. 154(b) by 71 days.

(21) Appl. No.: 18/951,734

(22) Filed: Nov. 19, 2024

(65) Prior Publication Data

US 2026/0028084 A1 Jan. 29, 2026

Related U.S. Application Data

(60) Provisional application No. 63/675,187, filed on Jul. 24, 2024.

(51) Int. Cl.
*B62J 50/21* (2020.01)
*B62J 45/20* (2020.01)
*G07C 5/02* (2006.01)

(52) U.S. Cl.
CPC ............... *B62J 50/21* (2020.02); *B62J 45/20* (2020.02); *G07C 5/02* (2013.01)

(58) Field of Classification Search
CPC .............. B62J 50/21; B62J 45/20; G07C 5/02
See application file for complete search history.

(56) References Cited

U.S. PATENT DOCUMENTS

| | | | | |
|---|---|---|---|---|
| 9,247,779 | B1 | 2/2016 | Aloumanis et al. | |
| 12,300,043 | B1 * | 5/2025 | Schmitt | G06N 20/00 |
| 2022/0189215 | A1 * | 6/2022 | Erkkilä | B60W 50/0205 |
| 2022/0221867 | A1 * | 7/2022 | Taveira | G05D 1/617 |

(Continued)

FOREIGN PATENT DOCUMENTS

| | | | | | |
|---|---|---|---|---|---|
| CN | 114402377 | A * | 4/2022 | G08G 1/065 |
| EP | 1679673 | A1 | 7/2006 | B62J 99/00 |

(Continued)

OTHER PUBLICATIONS

International Search Report and Written Opinion, Application No. PCT/US2024/057008, 15 pages, Apr. 17, 2025.

(Continued)

*Primary Examiner* — Donald J Wallace
*Assistant Examiner* — Jalal C Coduroglu
(74) *Attorney, Agent, or Firm* — SLAYDEN GRUBERT BEARD PLLC

(57) ABSTRACT

Systems and methods are provided for guiding visually impaired motorcycle passengers. A method comprises storing road characteristic data, including a road characteristic at a point in a road, receiving motorcycle vector data of a motorcycle traveling toward the point in the road, determining an anticipated motorcycle passenger position at the point in the road, and notifying a motorcycle passenger of the anticipated motorcycle passenger position before the motorcycle arrives at the point in the road. A device comprises a road characteristic circuit, a motorcycle vector circuit, a motorcycle characteristic circuit, and a communication circuit to communicate a notification of an anticipated passenger position to a motorcycle passenger.

21 Claims, 10 Drawing Sheets

(56) References Cited

U.S. PATENT DOCUMENTS

| | | | | |
|---|---|---|---|---|
| 2023/0005364 | A1 * | 1/2023 | Walter | G08G 1/0112 |
| 2023/0005374 | A1 * | 1/2023 | Elimaleh | G08G 1/0112 |
| 2023/0278573 | A1 | 9/2023 | Berniolles et al. | |
| 2024/0182129 | A1 * | 6/2024 | Venkata Jagannadha Rao | B62J 45/412 |

FOREIGN PATENT DOCUMENTS

| | | | | |
|---|---|---|---|---|
| JP | 2015200511 | A | 11/2015 | G01C 21/34 |
| WO | WO-2005038745 | A1 * | 4/2005 | B62J 45/4151 |

OTHER PUBLICATIONS

Micrel Inc, "MIC59300 Data Sheet," URL: https://www.microchip.com/en-us/product/MIC59300, 15 pages, Jan. 2009.

Microchip Technology Incorporated, "BM83 Bluetooth® Stereo Audio Module Data Sheet," URL: https://www.microchip.com/en-us/product/bm83, 79 pages, © 2019-2024.

* cited by examiner

GUIDANCE SYSTEM AND METHODS FOR VISUALLY IMPAIRED MOTORCYCLE PASSENGERS

RELATED PATENT APPLICATION

This application claims priority to commonly owned U.S. Provisional Patent Application No. 63/675,187 filed Jul. 24, 2024, the entire contents of which are hereby incorporated by reference for all purposes.

TECHNICAL FIELD

The present disclosure relates to guidance systems for visually impaired persons, in particular, it relates to guidance systems for visually impaired motorcycle passengers.

BACKGROUND

Visually impaired motorcycle passengers have a real challenge riding behind a driver of a motorcycle as they cannot predict the dynamics of the road. There is a need of constant and exhausting communication the driver must do, so that the visually impaired passenger does not negatively affect the riding experience, caused by the lack of anticipation. Visually impaired motorcycle passengers have difficulty anticipating the motorcycle's trajectory or dynamics because they cannot anticipate oncoming road conditions. To maintain stability and control, a motorcycle passenger should shift weight together with the driver, or at least maintain weight in a neutral position. Motorcycle passengers are responsible to maintain a position on a motorcycle by muscle tensioning when the motorcycle is stopping, accelerating, and/or cornering. Because the passenger is visually impaired, the motorcycle driver typically communicates with the passenger to advise of immediate control actions, which places demands on the driver that may distract the driver from his/her primary responsibility to operate the motorcycle in a safe manner. Usually, the driver communicates to a visually impaired passenger when a left or right curve is imminent, when braking is about to occur, when acceleration is about to begin or increase. For an optimal experience in which the passenger does not negatively affect the motorcycle dynamics, the driver should communicate details such as: leaning side, brake force, distance to where the leaning or braking process starts, when the leaning process stops and straightening/acceleration of the motorcycle begins.

There is a need for guidance systems for visually impaired motorcycle passengers.

SUMMARY

According to an aspect, there is provided a method comprising: storing road characteristic data, including a road characteristic at a point in a road; receiving motorcycle vector data of a motorcycle traveling toward the point in the road; determining an anticipated motorcycle passenger position at the point in the road; and notifying a motorcycle passenger of the anticipated motorcycle passenger position before the motorcycle arrives at the point in the road.

An aspect provides the method of the preceding paragraph, wherein the anticipated motorcycle passenger position comprises a position selected from: small lean left, small lean right, small brace forward, small brace rearward, large lean left, large lean right, large brace forward, large brace rearward, and center position.

An aspect provides the method of one of the preceding two paragraphs, wherein the motorcycle vector data comprises speed, acceleration, or deceleration.

An aspect provides the method of one of the preceding three paragraphs, comprising notifying a motorcycle driver of the anticipated motorcycle passenger position before the motorcycle arrives at the point in the road.

An aspect provides the method of one of the preceding four paragraphs, comprising notifying the motorcycle passenger of a period of time until the motorcycle passenger is to assume the anticipated motorcycle passenger position.

An aspect provides the method of one of the preceding five paragraphs, wherein the notifying a motorcycle passenger of the anticipated motorcycle passenger position comprises sounding an audible message.

An aspect provides the method of one of the preceding six paragraphs, comprising providing a plurality of riding modes from which a riding mode may be selected.

According to an aspect, there is provided a device comprising: a controller comprising a processor and memory; a road characteristic circuit to transmit road characteristic data, including a road characteristic at a point in a road, to the controller; a motorcycle vector circuit to communicate motorcycle vector data, including the motorcycle's vector relative to the point in the road, to the controller; a motorcycle characteristic circuit to communicate a motorcycle characteristic, to the controller; and a communication circuit to communicate a notification of an anticipated passenger position from the controller to a motorcycle passenger, wherein the memory comprises instructions which when executed by the processor are to determine an anticipated passenger position at the point in the road based on the road characteristic at the point in the road, the motorcycle's vector relative to the point in the road, and the vehicle characteristic.

An aspect provides the device of the preceding paragraph, wherein the road characteristic is selected from: road radius of curvature, road bank angle, road inclination, road declination, road hazard, road surface, road weather condition, and road traffic condition.

An aspect provides the device of one of the preceding two paragraphs, wherein the road characteristic circuit is to receive road data in real time from a sensor associated with the motorcycle or from a database comprising previously charted road data.

An aspect provides the device of one of the preceding three paragraphs, wherein the motorcycle vector data comprises GPS data or data provided by a sensor associated with the motorcycle.

An aspect provides the device of one of the preceding four paragraphs, wherein the motorcycle characteristic is selected from motorcycle lean angle, motorcycle braking, and motorcycle accelerating.

An aspect provides the device of one of the preceding five paragraphs, wherein the notification comprises an audible message.

An aspect provides the device of one of the preceding six paragraphs, comprising a communication circuit to communicate a notification from the controller to a motorcycle driver.

According to an aspect, there is provided a system comprising: a guidance host, comprising: a controller comprising a processor and memory; a road characteristic circuit to transmit road characteristic data, including a road characteristic at a point in a road, to the controller; a motorcycle vector circuit to communicate motorcycle vector data, including the motorcycle's real-time vector relative to the point in the road, to the controller; a motorcycle characteristic circuit to communicate a real-time motorcycle characteristic, to the controller; and a communication circuit to communicate a notification from the controller to a motorcycle passenger, wherein the memory comprises instructions for execution by the processor to determine an anticipated passenger position at the point in the road based on the road characteristic at the point in the road, the motorcycle's real-time vector relative to the point in the road, and the real-time vehicle characteristic, wherein the notification is based on the anticipated passenger position; a guidance client, comprising: a communication circuit to receive the notification from the guidance host; and a communication interface to communicate the notification from the communication circuit to a motorcycle passenger.

An aspect provides the system of the preceding paragraph, wherein the road characteristic is selected from: road radius of curvature, road bank angle, road inclination, road declination, road hazard, road surface, road weather condition, and road traffic condition.

An aspect provides the system of one of the preceding two paragraphs, wherein the road characteristic circuit is to receive road data in real time from a sensor associated with the motorcycle or from a database comprising previously charted road data.

An aspect provides the system of one of the preceding three paragraphs, wherein the motorcycle vector data comprises GPS data or data provided by a sensor associated with the motorcycle.

An aspect provides the system of one of the preceding four paragraphs, wherein the motorcycle characteristic is selected from motorcycle lean angle, motorcycle braking, and motorcycle accelerating.

An aspect provides the system of one of the preceding five paragraphs, wherein the communication interface is to communicate a notification comprising an audible message.

An aspect provides the system of one of the preceding six paragraphs, comprising a communication circuit to communicate a notification from the controller to a motorcycle driver.

BRIEF DESCRIPTION OF THE DRAWINGS

The figures illustrate examples of guidance systems for visually impaired motorcycle passengers.

Figure 1:
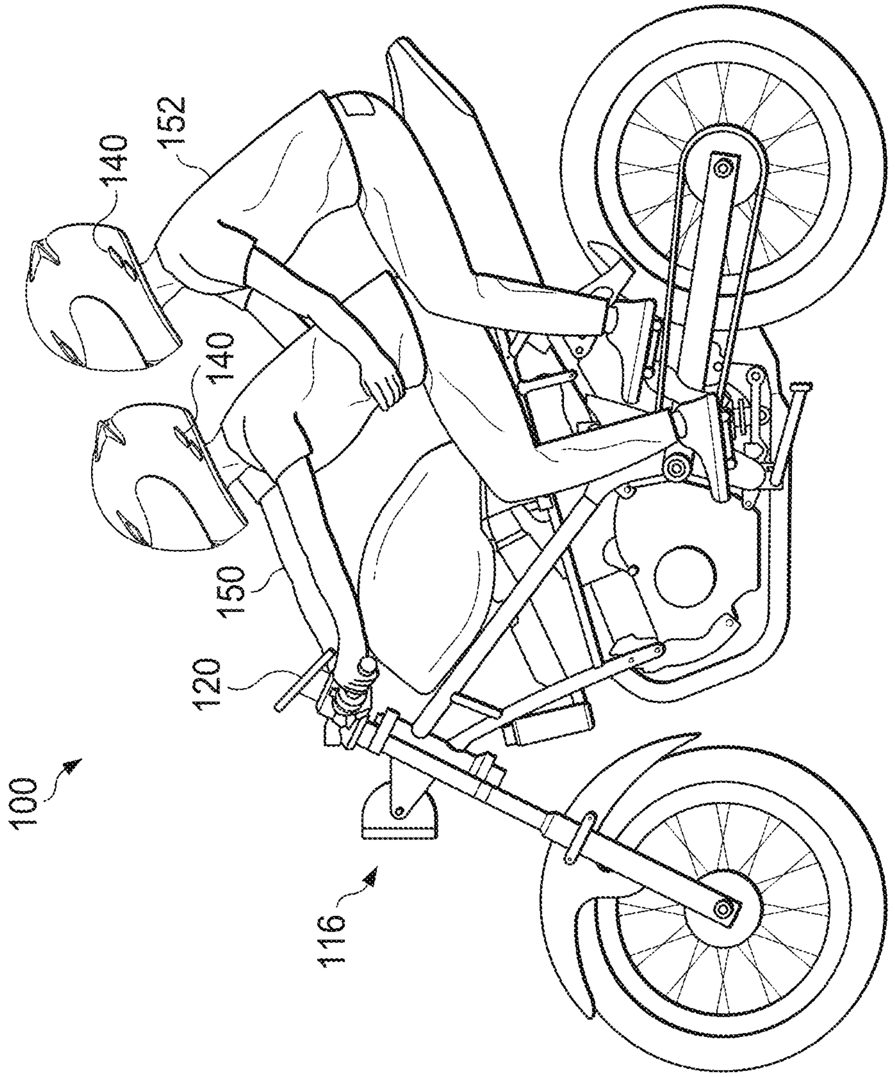
FIG. 1 shows a guidance system may be associated with a motorcycle, wherein a guidance host may be attached to the motorcycle, and a guidance client may be incorporated into motorcycle helmets or other head gear worn by the motorcycle driver and motorcycle passenger 152.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DESCRIPTION

This invention is a guidance system (device-hardware and software assembly) which can be attached to a motorcycle, and which provides voice instructions to both a driver and a visually impaired passenger so that they keep their weight and balance synchronized while operating a motorcycle.

A system provides data and instructions both to the rider and passenger, depending on road position, speed or road ahead. Such a system may reduce demands on the driver so he/she can focus on more important actions while riding, keeping both riders safe. Additionally, this system may enhance the riding experience for both the motorcycle driver and the passenger.

The guidance system may be attached to the motorcycle (main unit, called host). It may be battery-operated or plugged into the 12V outlet (or USB). It may be connected to GPS services and have access to real-time location functionality. The host may provide instructions to both the driver and the passenger through a generic helmet intercom (speakers inside the helmet). The host may provide an audio alarm in case of an incoming dangerous situation (e.g. speed too high for a curve). The guidance system may rely on road data that has been collected to a database. For example, the road may have been already charted and a table with speed vs recommended lean angle, or breaking instructions is already in place and provided previously to the system. The system may be a gadget-like object, referenced herein as a "host," which can be attached to the motorcycle. It can either be battery operated or can be plugged into the motorcycle's USB or 12V system.

The host is comprised of a GPS module, a 4G/5G module (for online navigation data), an accelerometer module, a Bluetooth module, a host Microcontroller (MCU) and other passive or active components for power conversions or communication. The host Microcontroller is the 'brains' of this system, controlling the modules, and sending the instructions to the motorcycle driver and passenger. The GPS module is required for real-time GPS data like location and speed. The information is passed to the host MCU via UART, I2C or SPI. The 4G/5G module is used for map data reception. This must be connected to an online maps and navigation system (e.g. Google Maps). The accelerometer module is used to measure the leaning angle and speed of the motorcycle in real time. The Bluetooth module is used for connecting to the motorcycle riders intercom system residing in the helmets (or it could be any generic Bluetooth earphones). The Dynamic Guidance system will provide instructions to both riders depending on the location, speed and left/right turn radius. The instructions are: leaning angle, brake force required for the next curve or signaling a possible difficult situations (e.g. speed too big for a sharp turn). The instructions are provided to both riders in a pre-configured time, before the actions must take place (e.g. "right turn, 30 degrees leaning in 30 meters/100 feet").

FIG. 1 shows a guidance system 100 may be associated with a motorcycle 116. A guidance host 120 may be attached to the motorcycle 116. A guidance client 140 may be incorporated into motorcycle helmets or other head gear worn by the motorcycle driver 150 and motorcycle passenger 152. The guidance system 100 may be battery-operated or plugged into the 12V outlet (or USB) of the motorcycle 116. The guidance system 100 may be connected to GPS services and have access to real-time location data. The guidance system 100 may provide instructions to both the motorcycle driver 150 and the motorcycle passenger 152 through a generic helmet intercom (speakers inside the helmet). The guidance system 100 may provide an audio alarm in case of an incoming dangerous situation (e.g. speed too high for a curve).

Figure 2:
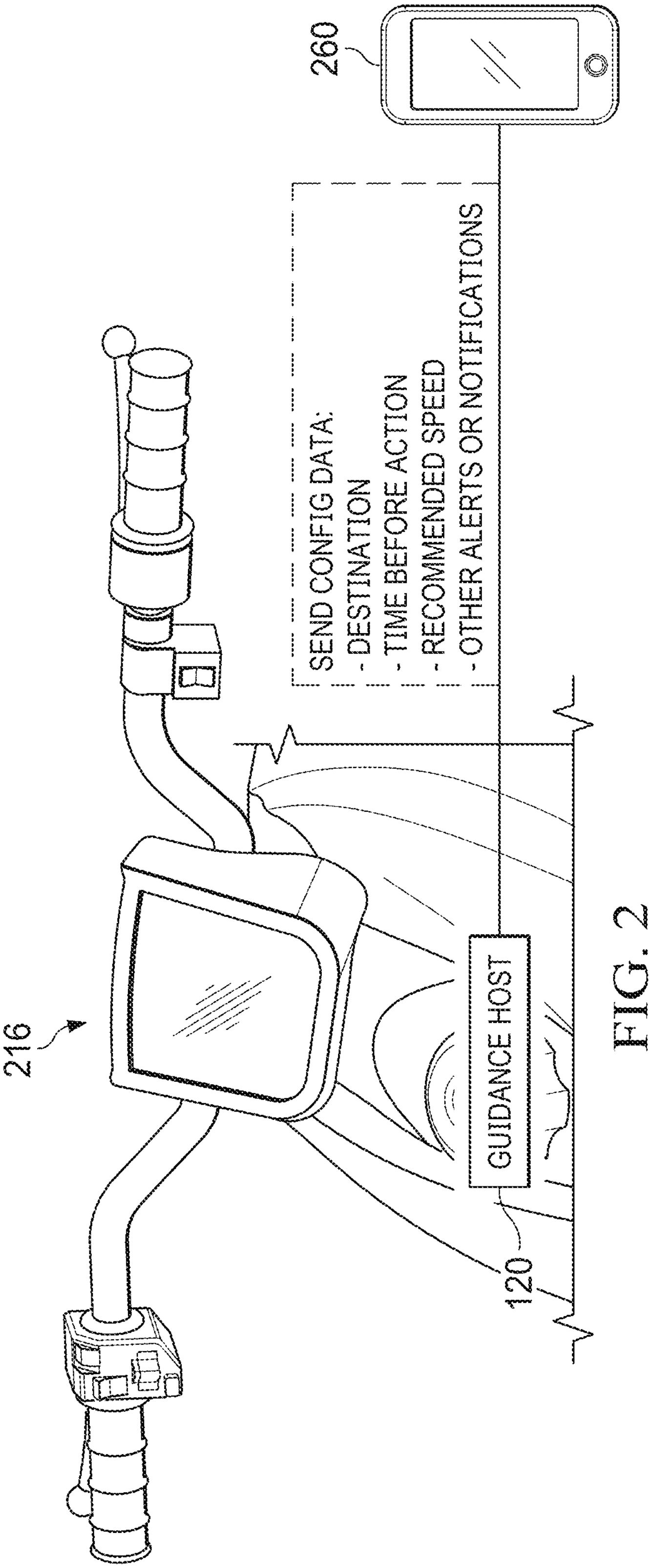
FIG. 2 shows the guidance host device attached to a motorcycle and an associated smart phone for configuring the host.

FIG. 2 shows a guidance host 220 attached to a motorcycle 216 and an associated computing device 260, for example, a smart phone. The computing device 260 may connect to the guidance host 220 and provide configuration data, such as: trip destination, trip route, time before actions taken, recommended speed, and other alerts or notifications.

Figure 3:
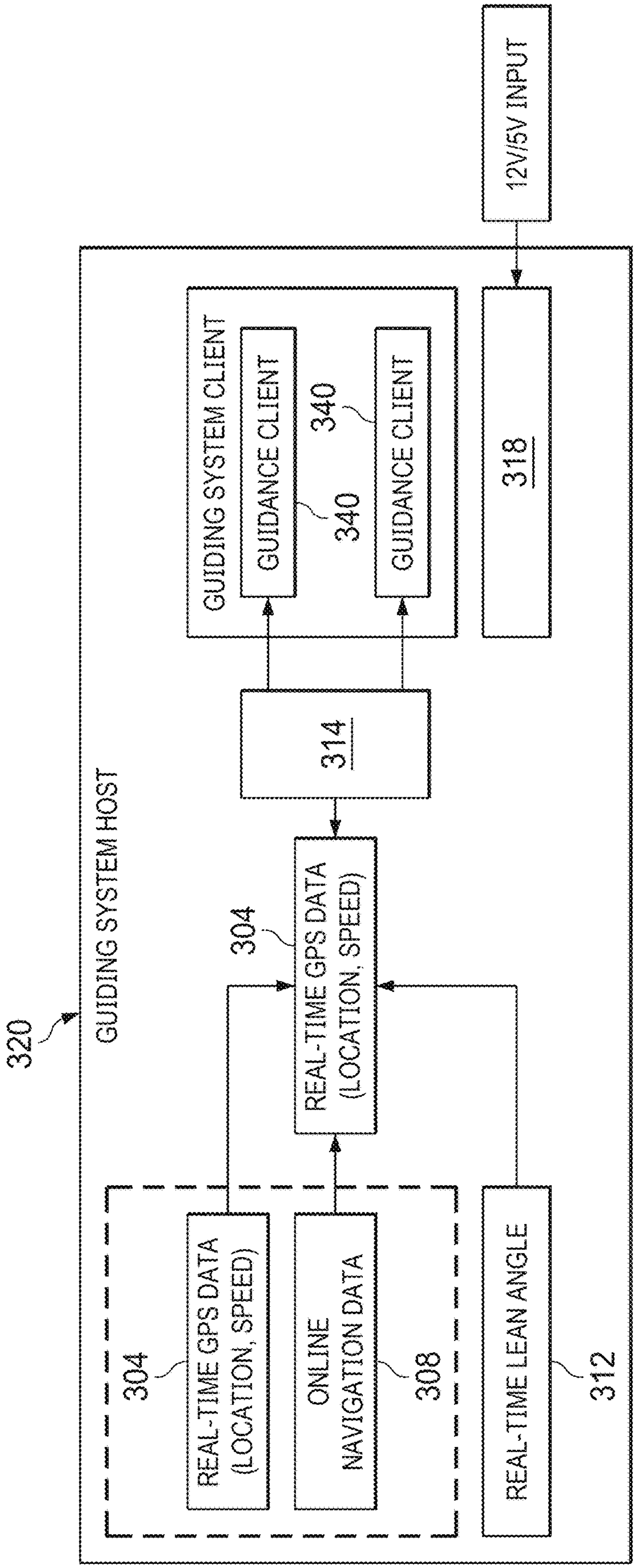
FIG. 3 shows a block diagram of a guidance host device for generating notifications and a guidance client interface for communicating notifications to the motorcycle passenger.

FIG. 3 shows a block diagram of the guidance host 320 and the guidance client 340. The guidance host 320 has a processor 304, motorcycle vector circuit 310, for example a location (GPS) module, a road characteristic circuit 308, for example a data transmission module, a motorcycle characteristic circuit 312, for example an accelerometer module, a communication circuit 314, for example a communication (Bluetooth) module, and a power circuit 618. The location (GPS) module may provide real-time GPS data, including motorcycle location and speed. The data transmission module may provide navigation information (maps, route, hazard, weather, without limitation) data via 4G/5G network infrastructure. The accelerometer module may provide real-time motorcycle lean information indicating the position of the motorcycle relative to a horizonal plane. The communication (Bluetooth) module may provide a connection for communication with the guidance client 340. The power module may provide a 12V/5V input via a voltage regulator. The guidance client 340 may comprise a MCU, a communication (Bluetooth) module, and a communication interface module in the form of an intercom system.

An intercom in the guidance client 340 may be a conventional Bluetooth™ receiver, or other wireless receiver such as ZigBee™. An intercom in the guidance client 340 may communicate with the guidance host 320 via an infra-red link or radio link using radio access technology (RAT), which may refer to any RAT such as, for example, Universal Terrestrial Radio Access Network (UTRA), Evolved Universal Terrestrial Radio Access Network (E-UTRA), narrow band internet of things (NB-IoT), WiFi, Bluetooth, next generation RAT, NR, 4G, 5G, etc. Any of the equipment denoted by the terms node, network node or radio network node may be capable of supporting a single or multiple RATs.

The guidance host 320 may communicate with standard communication infrastructure to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox. In some examples, the guidance host may communicate with a telecommunication network that is a cellular network that implements 3 GPP standardized features.

Figure 4A:
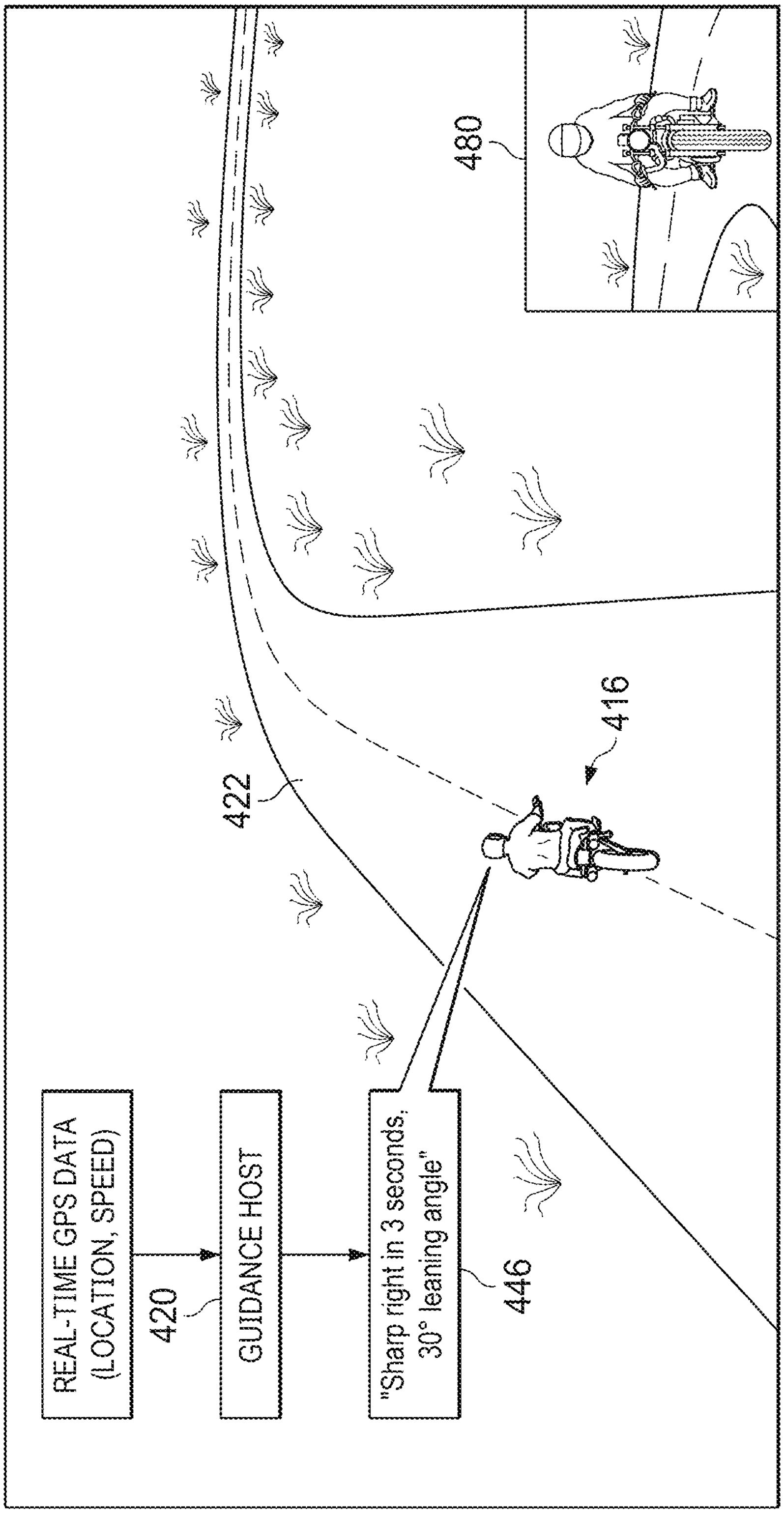
FIG. 4A shows a landscape view of a motorcycle traveling on a road.

FIG. 4A shows a landscape view of a motorcycle 416 traveling on a road 422. Prior to or in real-time, the guidance host 420 has acquired navigation information (maps, route, hazard, weather, without limitation) data regarding the road 422 being traveled. Further, in real-time, the host is acquiring real-time GPS data, including motorcycle location and speed. A thumbnail image 480 at the bottom right side of FIG. 4A shows the inclination of the motorcycle relative to the horizon. Because the motorcycle 416 is traveling on a straight section of the road 422, the motorcycle inclination is vertical (no inclination). As the motorcycle 416 approaches a right-hand curve in the road 422, the guidance host 420 communicates a notification 446 to the guidance client associated with a motorcycle driver or a motorcycle passenger. The notification 446 may include: "prepare to decelerate," "prepare to lean right," without limitation. As illustrated, the notification 446 is an audible statement, "sharp right in 3 seconds, 30° leaning angle." The notification 446 may be provided at a point in time in advance of when the motorcycle 416 arrives at the curve to allow the passenger to prepare for and timely execute bracing and weight shifting actions as the motorcycle 416 enters the curve. The timing and substance of the notification may be based on a number of factors including: the radius of the curve, the slope of the road (degree of banking), the conditions of the road surface (wet or dry pavement), the speed of the motorcycle, the distance of the motorcycle from the curve, without limitation. The notification may be given with a countdown, "lean to right in 3 . . . 2 . . . 1 . . . lean."

Figure 4B:
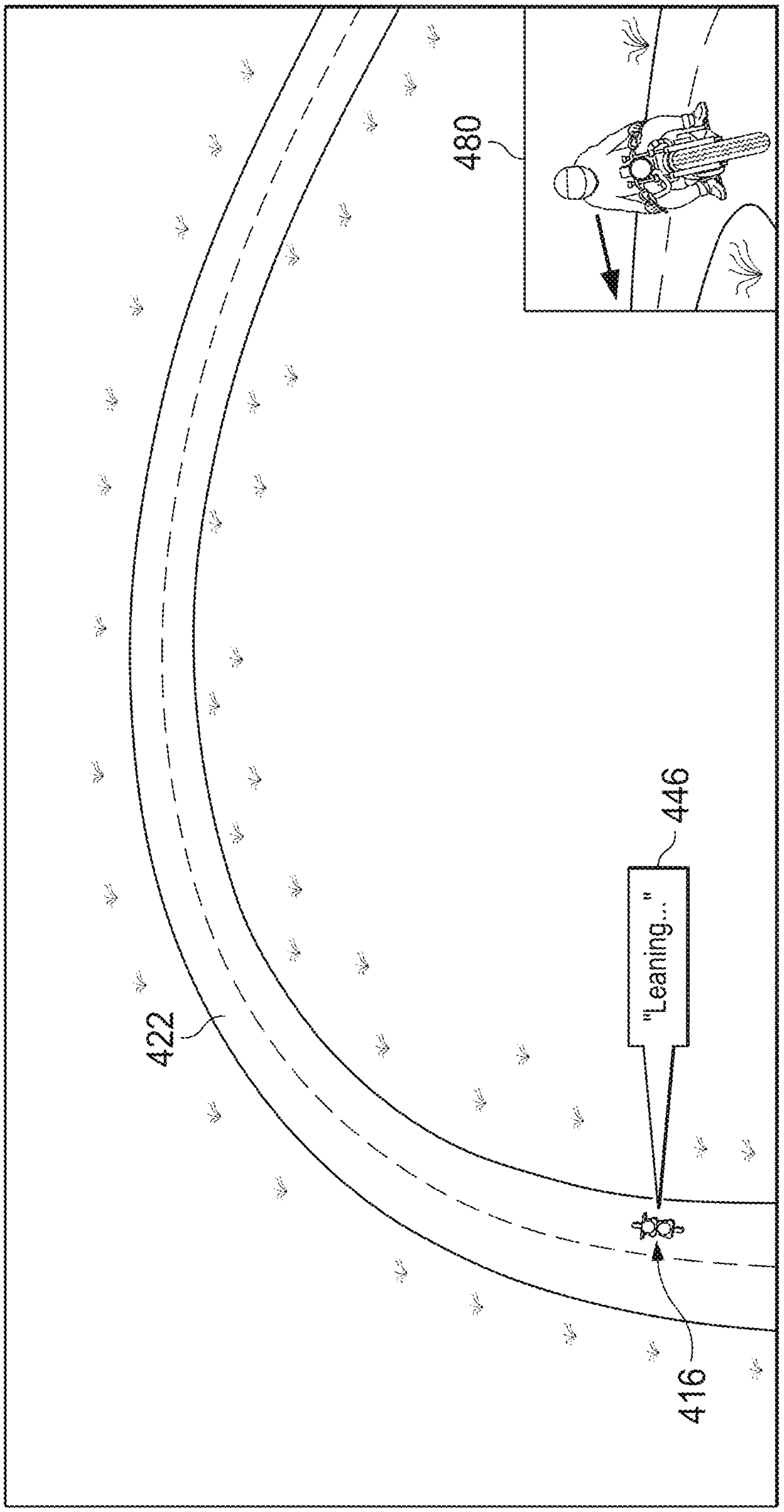
FIG. 4B shows a top view of the motorcycle traveling on the road shown in FIG. 4A, wherein the motorcycle has just entered a right curve in the road.

FIG. 4B shows a top view of the motorcycle 416 traveling on the road 422 shown in FIG. 4A. The motorcycle 416 has just entered the right hand curve in the road 422. The guidance host is communicating a notification to the guidance client, "Leaning . . . ," so as to advise the visually impaired passenger to continue leaning to the right as the motorcycle drives through the curve to the right. The inclination of the motorcycle is shown in the thumbnail image 480 at the bottom-right of the figure. The motorcycle is inclined to the right.

Figure 4C:
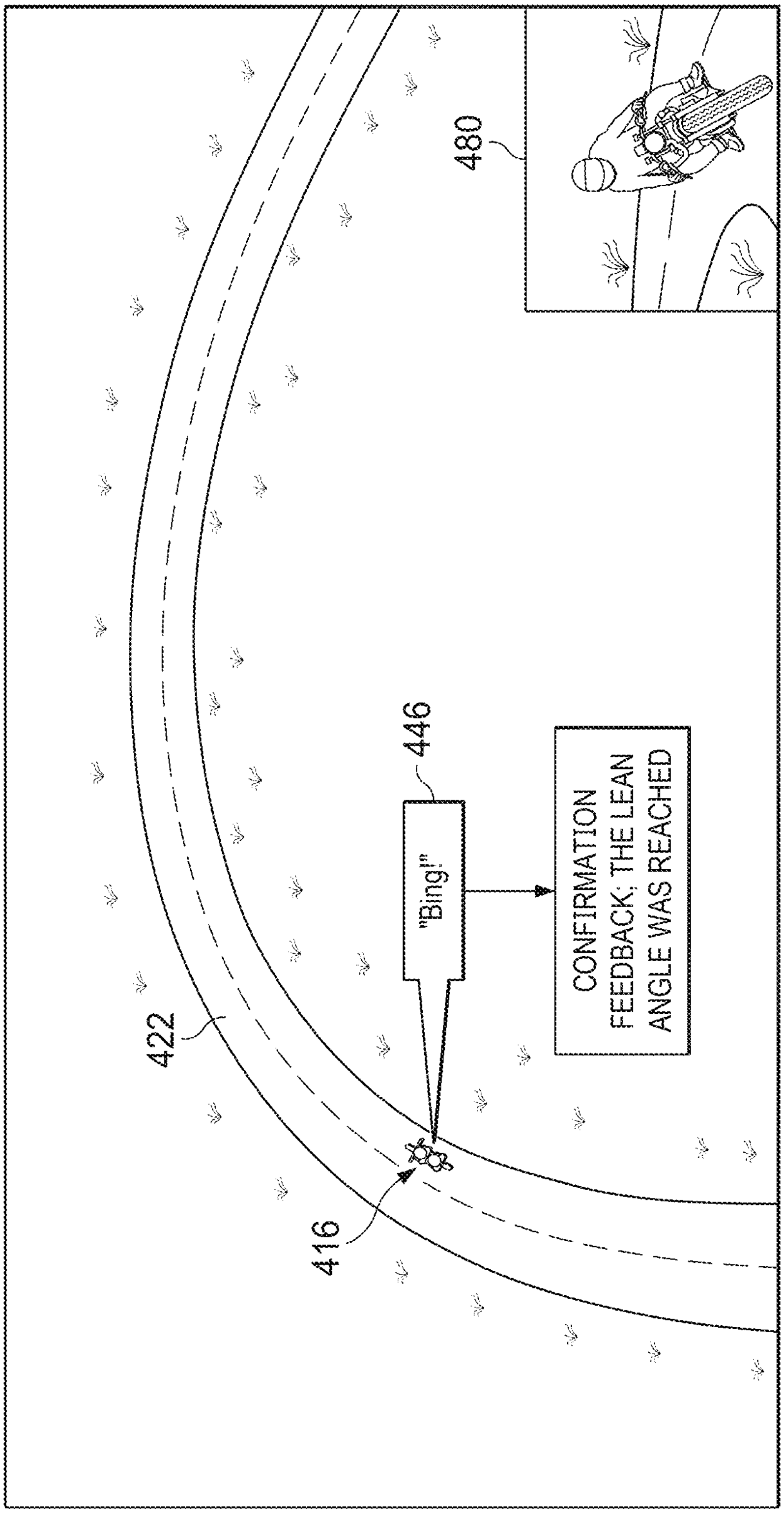
FIG. 4C shows a top view of the motorcycle traveling on the road shown in FIGS. 4A-4B, wherein the motorcycle is well into the right curve in the road.

FIG. 4C shows a top view of the motorcycle 416 traveling on the road 422 shown in FIGS. 4A-4B. The motorcycle 416 is well into the right curve in the road 422. The guidance host is communicating a notification 446 to the guidance client, "Bing," so as to provide feedback to the visually impaired motorcycle passenger that the correct inclination angle has been reached. The guidance host may receive feedback that the correct lean angle has been reached. The inclination of the motorcycle is shown in the thumbnail image 480 at the bottom-right of the figure. The motorcycle is significantly inclined to the right.

Figure 4D:
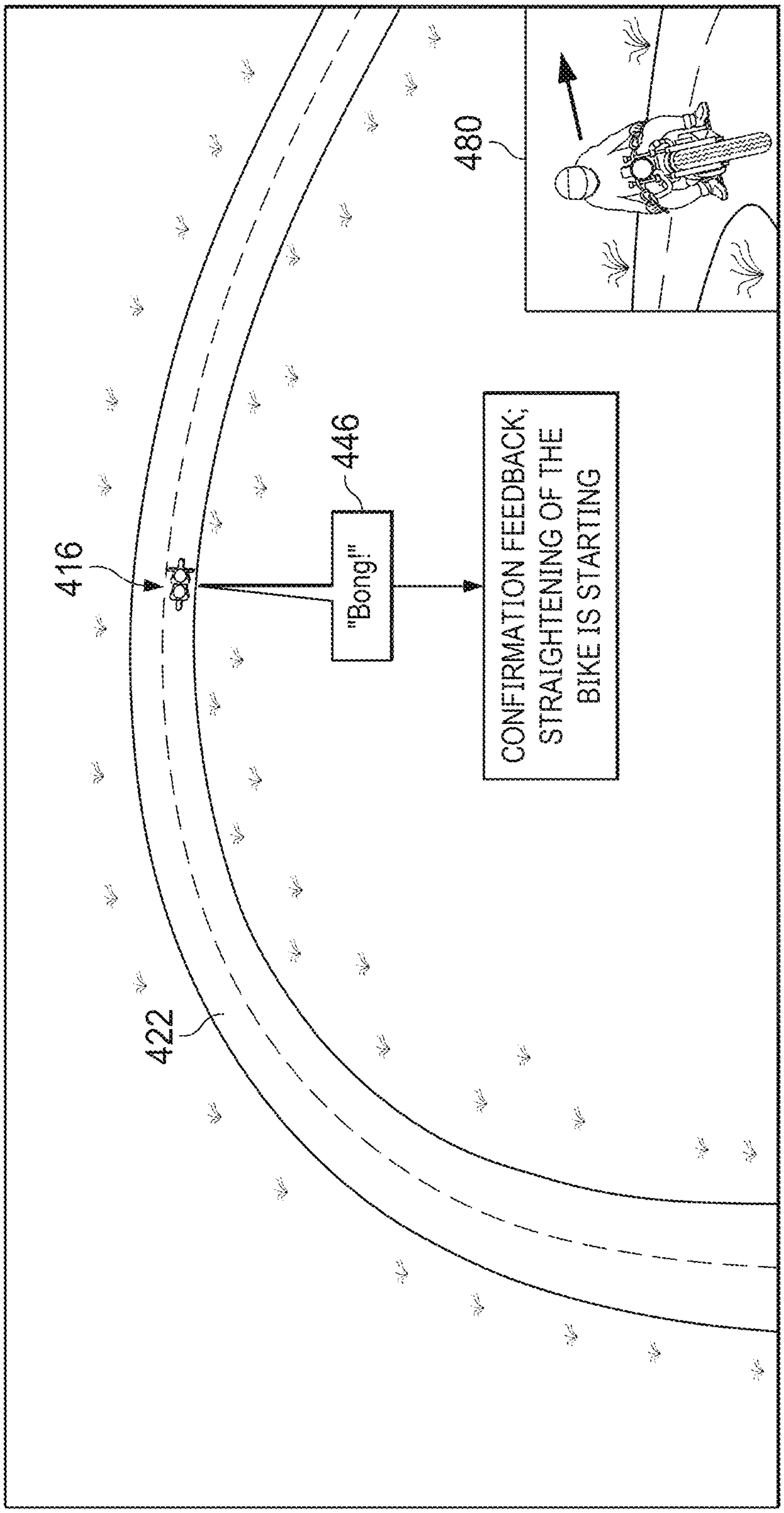
FIG. 4D shows a top view of the motorcycle traveling on the road shown in FIGS. 4A-4C, wherein the motorcycle is coming out of the right curve in the road.

FIG. 4D shows a top view of the motorcycle 416 traveling on the road 422 shown in FIGS. 4A-4C. The motorcycle 416 has progressed farther down the road 422 and is coming out of the right curve in the road 422. The guidance host is communicating a notification 446 to the guidance client, "Bong," so as to provide feedback to the visually impaired motorcycle passenger to reduce the inclination angle and straighten relative to the motorcycle more toward a vertical position. The guidance host may receive feedback that the motorcycle inclination has started to move toward a vertical position. The inclination of the motorcycle is shown in the thumbnail image 480 at the bottom-right of the figure. The motorcycle is slightly inclined to the right and is moving toward being vertical.

The guidance host may communicate a variety of notifications. For example, the guidance host may instruct the visually impaired motorcycle passenger to lean left, lean right, straighten up from left, straighten up from right, brace for braking, stand on footpegs, without limitation. Notifications may further include audible noises such as ping, bong, tweet, whistle, without limitation. Notifications may depend on a variety of road conditions and motorcycle characteristics, including without limitation, curves in the road, traffic signs, weather conditions, road hazard conditions, upgrades, downgrades, other vehicles in the roadway, motorcycle acceleration, motorcycle deceleration, and motorcycle leaning right or left.

An aspect provides that the guidance system is configurable based on the rider's preferred or selected riding style. For example, the guidance system may record a rider's movements over a number of rides to "learn" the rider's body positions and movements as the motorcycle makes specific actions and assumes different characteristics as it moves through different road conditions. As another example, the rider may select various riding modes, including: race or cruise, wherein "race" would advise the rider to take more aggressive positions quicker (spirited riding style), and "cruise" would advise the rider to take more relaxed positions more slowly (relaxed riding style). A selection between riding modes will result in different instructions being sent to the driver and passenger (e.g. when it comes to lean angle, braking position, and acceleration position).

Figure 5:
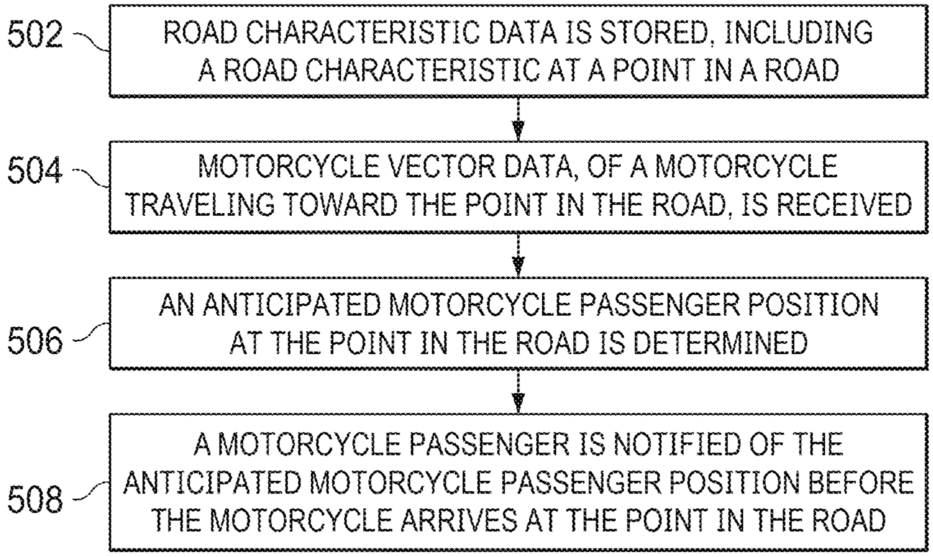
FIG. 5 shows a flow chart for a method for guiding visually impaired motorcycle passengers.

FIG. 5 shows a flow chart for a method. According to the method, road characteristic data is stored 502, including a road characteristic at a point in a road. Motorcycle vector data, of a motorcycle traveling toward the point in the road, is received 504. An anticipated motorcycle passenger position at the point in the road is determined 506. A motorcycle passenger is notified 508 of the anticipated motorcycle passenger position before the motorcycle arrives at the point in the road.

Figure 6:
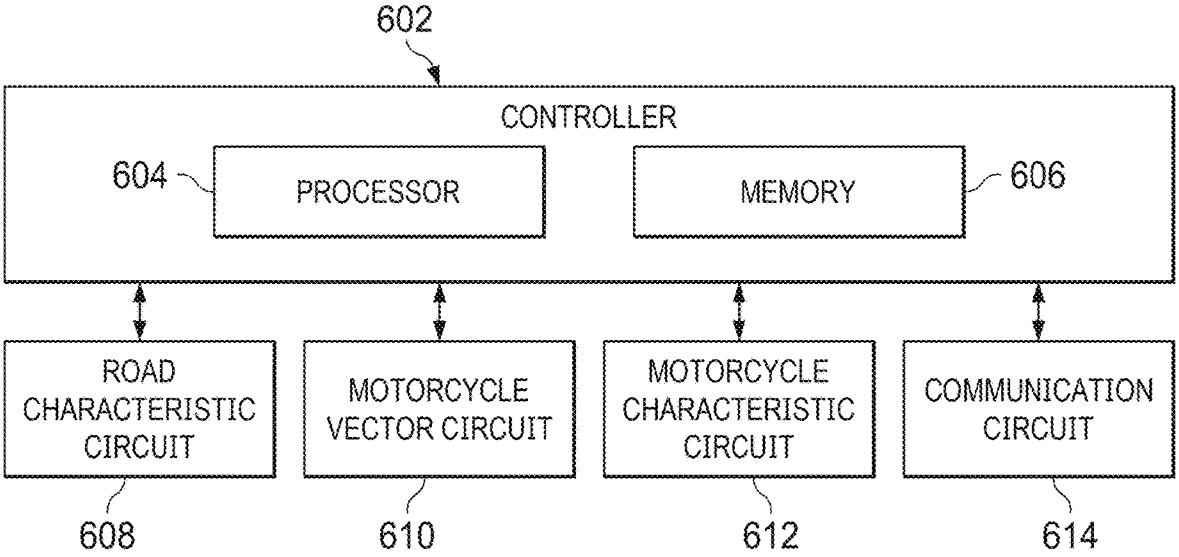
FIG. 6 shows a circuit diagram for a guidance host for guiding visually impaired motorcycle passengers.

FIG. 6 shows a circuit diagram for a guidance host. A guidance host may comprise a controller 602 having a processor 604 and memory 606. The guidance host may include a road characteristic circuit 608 to transmit road characteristic data, including a road characteristic at a point in a road, to the controller 602. The guidance host may include a motorcycle vector circuit 610 to communicate motorcycle vector data, including the motorcycle's vector relative to the point in the road, to the controller 602. The guidance host may include a motorcycle characteristic circuit 612 to communicate a motorcycle characteristic, to the controller 602. The guidance host may include a communication circuit 614 to communicate a notification of an anticipated passenger position from the controller 602 to a motorcycle passenger, wherein the memory 606 comprises instructions which when executed by the processor are to determine an anticipated passenger position at the point in the road based on the road characteristic at the point in the road, the motorcycle's vector relative to the point in the road, and the vehicle characteristic.

Figure 7:
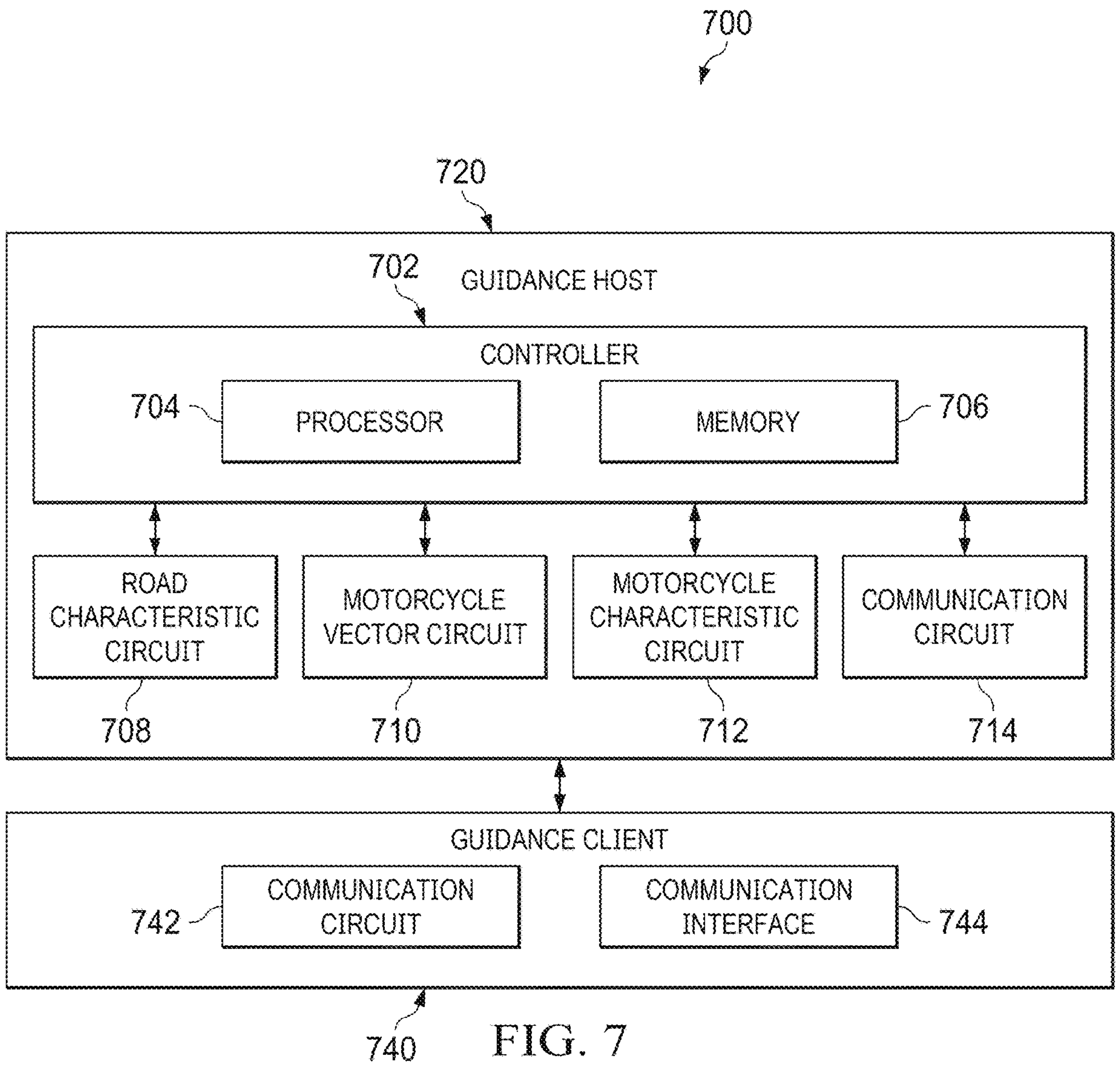
FIG. 7 shows a circuit diagram for a guidance system for guiding visually impaired motorcycle passengers.

FIG. 7 shows a circuit diagram for a guidance system 700. A guidance host 720 may comprise a controller 702 having a processor 704 and memory 706. The guidance host 720 may include a road characteristic circuit 708 to transmit road characteristic data, including a road characteristic at a point in a road, to the controller 702. The guidance host 720 may include a motorcycle vector circuit 710 to communicate motorcycle vector data, including the motorcycle's vector relative to the point in the road, to the controller 702. The guidance host 720 may include a motorcycle characteristic circuit 712 to communicate a motorcycle characteristic, to the controller 702. The guidance host 720 may include a communication circuit 714 to communicate a notification of an anticipated passenger position from the controller 702 to a motorcycle passenger, wherein the memory 706 comprises instructions which when executed by the processor are to determine an anticipated passenger position at the point in the road based on the road characteristic at the point in the road, the motorcycle's vector relative to the point in the road, and the vehicle characteristic. A guidance client 740 may have a communication circuit 742 to receive the notification from the guidance host 720. The guidance client 740 may also have a communication interface 744 to communicate the notification from the communication circuit 742 to a motorcycle passenger.

The circuits identified herein may be implemented by instructions for execution by a processor, analog circuitry, digital circuitry, control logic, digital logic circuits programmed through hardware description language, application specific integrated circuits (ASIC), field programmable gate arrays (FPGA), programmable logic devices (PLD), or any suitable combination thereof, whether in a unitary device or spread over several devices. The circuits identified herein may be implemented by instructions for execution by a processor through, for example, a function, application programming interface (API) call, script, program, compiled code, interpreted code, binary, executable, executable file, firmware, object file, container, assembly code, or object. For example, the circuits identified herein may may be implemented by instructions stored in a non-transitory medium such as a memory that, when loaded and executed by a processor such as a CPU (or any other suitable process), cause the functionality of the circuits described herein.

Although examples have been described above, other variations and examples may be made from this disclosure without departing from the spirit and scope of these disclosed examples.

The invention claimed is:

1. A method comprising:

storing road characteristic data, including a road characteristic at a point in a road;

receiving motorcycle vector data of a motorcycle traveling toward the point in the road;

determining an anticipated motorcycle passenger position at the point in the road; and notifying a motorcycle passenger of the anticipated motorcycle passenger position before the motorcycle arrives at the point in the road.

2. The method as in claim 1, wherein the anticipated motorcycle passenger position comprises a position selected from: small lean left, small lean right, small brace forward, small brace rearward, large lean left, large lean right, large brace forward, large brace rearward, and center position.

3. The method as in claim 1, wherein the motorcycle vector data comprises speed, acceleration, or deceleration.

4. The method as in claim 1, comprising notifying a motorcycle driver of the anticipated motorcycle passenger position before the motorcycle arrives at the point in the road.

5. The method as in claim 1, comprising notifying the motorcycle passenger of a period of time until the motorcycle passenger is to assume the anticipated motorcycle passenger position.

6. The method as in claim 1, wherein the notifying the motorcycle passenger of the anticipated motorcycle passenger position comprises sounding an audible message.

7. The method as in claim 1, comprising providing a plurality of riding modes from which a riding mode may be selected.

8. A device comprising:
a controller to be associated with a motorcycle and comprising a processor and memory;
a road characteristic circuit to transmit road characteristic data, including a road characteristic at a point in a road, to the controller;
a motorcycle vector circuit to communicate motorcycle vector data, including the motorcycle's vector relative to the point in the road, to the controller;
a motorcycle characteristic circuit to communicate a motorcycle characteristic, to the controller; and
a notification communication circuit to communicate a notification of an anticipated motorcycle passenger position from the controller to a motorcycle passenger,
wherein the memory comprises instructions which when executed by the processor are to determine the anticipated motorcycle passenger position at the point in the road based on the road characteristic at the point in the road, the motorcycle's vector relative to the point in the road, and the motorcycle characteristic.

9. The device as in claim 8, wherein the road characteristic is selected from: road radius of curvature, road bank angle, road inclination, road declination, road hazard, road surface, road weather condition, and road traffic condition.

10. The device as in claim 8, wherein the road characteristic circuit is to receive road data in real time from a sensor associated with the motorcycle or from a database comprising previously charted road data.

11. The device as in claim 8, wherein the motorcycle vector data comprises GPS data or data provided by a sensor associated with the motorcycle.

12. The device as in claim 8, wherein the motorcycle characteristic is selected from motorcycle lean angle, motorcycle braking, and motorcycle accelerating.

13. The device as in claim 8, wherein the notification comprises an audible message.

14. The device as in claim 8, wherein the notification communication circuit is to communicate a notification from the controller to a motorcycle driver.

15. A system comprising:
a guidance host, comprising:
a controller to be associated with a motorcycle and comprising a processor and memory;
a road characteristic circuit to transmit road characteristic data, including a road characteristic at a point in a road, to the controller;
a motorcycle vector circuit to communicate motorcycle vector data, including the motorcycle's real-time vector relative to the point in the road, to the controller;
a motorcycle characteristic circuit to communicate a real-time motorcycle characteristic, to the controller; and
a notification communication circuit to communicate a notification from the controller to a motorcycle passenger,
wherein the memory comprises instructions for execution by the processor to determine an anticipated motorcycle passenger position at the point in the road based on the road characteristic at the point in the road, the motorcycle's real-time vector relative to the point in the road, and the real-time motorcycle characteristic,
wherein the notification is based on the anticipated motorcycle passenger position;
a guidance client, comprising:
a receipt communication circuit to receive the notification from the guidance host; and
a communication interface to communicate the notification from the notification communication circuit to the motorcycle passenger.

16. The system as in claim 15, wherein the road characteristic is selected from: road radius of curvature, road bank angle, road inclination, road declination, road hazard, road surface, road weather condition, and road traffic condition.

17. The system as in claim 15, wherein the road characteristic circuit is to receive road data in real time from a sensor associated with the motorcycle or from a database comprising previously charted road data.

18. The system as in claim 15, wherein the motorcycle vector data comprises GPS data or data provided by a sensor associated with the motorcycle.

19. The system as in claim 15, wherein the motorcycle characteristic is selected from motorcycle lean angle, motorcycle braking, and motorcycle accelerating.

20. The system as in claim 15, wherein the communication interface is to communicate a notification comprising an audible message.

21. The system as in claim 15, wherein the notification communication circuit is to communicate a notification from the controller to a motorcycle driver.

* * * * *